US012762846B2

(12) United States Patent
Månsson et al.

(10) Patent No.: US 12,762,846 B2
(45) Date of Patent: Oct. 13, 2026

(54) METHOD FOR COLLECTING DATA FOR SUBSEQUENT TRAINING OF AN OBJECT DETECTION MODEL

(71) Applicant: ZENSEACT AB, Gothenburg (SE)

(72) Inventors: Olle Månsson, Gothenburg (SE); Willem Verbeke, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 141 days.

(21) Appl. No.: 18/816,624

(22) Filed: Aug. 27, 2024

(65) Prior Publication Data

US 2025/0078477 A1 Mar. 6, 2025

(51) Int. Cl.

| | |
|---|---|
| ***G06V 10/774*** | (2022.01) |
| ***G06V 20/56*** | (2022.01) |
| ***G06V 20/58*** | (2022.01) |
| ***G08G 1/01*** | (2006.01) |

(52) U.S. Cl.

CPC ............ *G06V 10/774* (2022.01); *G06V 20/58* (2022.01); *G06V 20/588* (2022.01); *G08G 1/0112* (2013.01); *G08G 1/0125* (2013.01)

(58) Field of Classification Search

CPC .... G06V 10/774; G06V 20/58; G06V 20/588; G08G 1/0112; G08G 1/0125

See application file for complete search history.

(56) References Cited

U.S. PATENT DOCUMENTS

| | | | | |
|---|---|---|---|---|
| 11,458,974 | B2 * | 10/2022 | McNew ................ | B60W 40/09 |
| 2017/0243370 | A1 | 8/2017 | Hoye et al. | |
| 2020/0117950 | A1 | 4/2020 | Thompson et al. | |
| 2020/0327807 | A1 | 10/2020 | Kamrani et al. | |
| 2021/0295171 | A1 | 9/2021 | Kamenev et al. | |
| 2022/0284744 | A1 | 9/2022 | Alibeigi et al. | |
| 2025/0244138 | A1 * | 7/2025 | Lerner ............... | G01C 21/3896 |

OTHER PUBLICATIONS

Ke, Ruimin et al.; "Lightweight Edge Intelligence Empowered Near-Crash Detection Towards Real-Time Vehicle Event Logging"; IEEE Transactions on Intelligent Vehicles, vol. 8, No. 4; Feb. 3, 2023; XP093118430; pp. 2737-2747 (11 pages).

Extended European Search Report mailed Jan. 11, 2024 for European Patent Application No. 23194603.9, 8 pages.

* cited by examiner

*Primary Examiner* — Boubacar Abdou Tchoussou

(74) *Attorney, Agent, or Firm* — Sage Patent Group

(57) ABSTRACT

The present invention relates to a method for collecting data for subsequent training of an object detection model of an automated driving system. The method includes, in response to detecting an evasive maneuver of the vehicle or a further road user, obtaining sensor data pertaining to a scene at which the evasive maneuver was detected; determining by the object detection model, whether an object is detected in the scene based on the sensor data; and in response to no object being detected, storing the sensor data for subsequent training of the object detection model. The present invention further relates to a method performed in a server.

15 Claims, 8 Drawing Sheets

METHOD FOR COLLECTING DATA FOR SUBSEQUENT TRAINING OF AN OBJECT DETECTION MODEL

CROSS-REFERENCE TO RELATED APPLICATIONS

The present application for patent claims priority to European Patent Office Application Ser. No. 23194603.9, entitled “A METHOD FOR COLLECTING DATA FOR SUBSEQUENT TRAINING OF AN OBJECT DETECTION MODEL” filed on Aug. 31, 2023, assigned to the assignee hereof, and expressly incorporated herein by reference.

TECHNICAL FIELD

The present invention relates to the field of autonomous vehicles. In particular, the present invention relates to methods and devices for collecting data for subsequent training of an object detection model.

BACKGROUND

With the development of technology in recent years, image capturing and processing techniques have become widely used in different fields of technology. In particular, vehicles produced today are commonly equipped with some form of vision or perception system for enabling new functionalities. Moreover, an increasing portion of modern vehicles has advanced driver-assistance systems (ADAS) to increase vehicle safety and more generally road safety. ADAS, which for instance may be represented by adaptive cruise control (ACC), collision avoidance system, forward collision warning, lane support systems, etc. are electronic systems that may aid a driver of the vehicle. Today, there is ongoing research and development within a number of technical areas associated to both the ADAS and the Autonomous Driving (AD) field. ADAS and AD may also be referred to under the common term Automated Driving System (ADS) corresponding to all of the different levels of automation as for example defined by the SAE J3016 levels (0-5) of driving automation.

An important task of ADAS and AD systems is to detect obstacles in the road, which today is commonly done by object detection in images captured by the vehicle, based on trained machine learning models. One of the key challenges in developing a system for object detection is the collection of large and representative datasets.

With the machine learning algorithms available today, one can be relatively confident that one can achieve good performance in detecting those types of objects that have good support in the dataset. Examples of types of objects comprises other vehicles, pedestrians, cyclists, traffic cones etc. and are readily available since these types of objects are commonly encountered in a driving scenario. However, the same cannot be said for less common objects for which little or no data is available. An example of such objects are road debris, or other types of unexpected obstructions, such as road surface damage. The fundamental properties of such objects are that they can appear in any way, shape, or form, and at very irregular occurrences. Due to the large variety and rarity of debris or other unexpected obstructions, training an object detection model to perform well at detecting all these objects is a challenging and time-consuming task today. One may for instance drive hundreds, or even thousands of kilometers, without even encountering any kind of debris.

There is therefore a need for improvement when it comes to the development of object detection models for recognizing debris or other unexpected obstructions, and in particular to the collection of training data of such objects.

SUMMARY

The herein disclosed technology seeks to mitigate, alleviate, or eliminate one or more of the above-identified deficiencies and disadvantages in the prior art to address various problems relating to the collection of data of rare or unexpected objects for development of autonomous or semi-autonomous vehicles.

To improve the performance of automated driving systems, in particular an object detection model of said system, one should collect and label as much data as possible for use in the training of the object detection model. As highlighted above, the fundamental properties of debris or other types of unexpected obstructions, i.e. the great variety and rarity in their occurrence, makes this a very challenging task.

The present invention provides a new and improved way of collecting training data, in particular of these kinds of objects. The presently disclosed technology provides a way to collect data which can then be used for subsequent training of an object detection model. The present inventive concept at least partly builds upon the realization that unexpected evasive maneuvers by vehicles can be utilized as a signal of the presence of an object being present. This is the first indication on which the present technology builds upon. Further, if the object detection model fails to detect an object in a scene at which the evasive maneuver took place, this can be utilized as a signal of there being some type of debris or unexpected obstruction present at that location, which the object detection model has not encountered before in the current training dataset. This is the second indication on which the present technology builds upon.

Various aspects and embodiments of the disclosed invention are defined below and in the accompanying independent and dependent claims.

According to a first aspect, there is provided a computer-implemented method, performed by a vehicle, for collecting data for subsequent training of an object detection model of an automated driving system. The method comprises, in response to detecting an evasive maneuver of the vehicle or a further road user, obtaining sensor data pertaining to a scene at which the evasive maneuver was detected. The method further comprises determining, by the object detection model, whether an object is detected in the scene based on the sensor data. The method further comprises, in response to no object being detected, storing the sensor data for subsequent training of the object detection model.

A possible associated advantage of the presently disclosed technology is that it provides for an improved way of collecting training data for object detection models, which in turn facilitates safer and more capable object detection models since they can be trained on a larger variety of objects. In particular, the present inventive concept provides an improved way of data mining for new or rare objects that may appear on a road, such as debris or other types of obstructing objects. The method can achieve this in an automated fashion, which allows this kind of data to be extracted from large data streams. More specifically, the present technology can employ a fleet of vehicles to collect this data from real world driving scenarios. Storing and manually going through all this data would not be a feasible alternative.

The presently disclosed technology may further increase the speed of the collection of relevant and/or annotated data. This can be achieved by the fact that the detection of the evasive maneuver, together with the fact that the object detection model fails to detect an object, can be used as a pre-annotation of sensor data obtained for the scene. The pre-annotation can be an indication that a new or rare object, on which the object detection model has not been trained, is present at the scene. This pre-annotation can thus also be used as an indication of the data potentially being relevant in the sense that the performance of the object detection model may be improved if it is trained on said data.

In addition, some embodiments of the presently disclosed technology provide for improved accuracy and efficiency in dealing with potential training samples, in that it can rely on multiple detections of evasive maneuvers before taking action on a potential training sample.

According to a second aspect, there is provided a computer program product comprising instructions which when the program is executed by a computing device, causes the computing device to carry out the method according to any embodiment of the first aspect. According to an alternative embodiment of the second aspect, there is provided a (non-transitory) computer-readable storage medium. The non-transitory computer-readable storage medium stores one or more programs configured to be executed by one or more processors of a processing system, the one or more programs comprising instructions for performing the method according to any embodiment of the first aspect. The above-mentioned features of the first aspect, when applicable, apply to this second aspect as well. In order to avoid undue repetition, reference is made to the above.

According to a third aspect, there is provided a computer-implemented method, performed by a server, for collecting data for subsequent training of an object detection model of an automated driving system. The method comprises receiving, from a vehicle, data indicative of having detected an evasive maneuver of the vehicle or a further road user, despite no object being detected by the object detection model in a scene at which the evasive maneuver was detected. The method further comprises receiving sensor data pertaining to the scene at which the evasive maneuver was detected. The method further comprises storing the sensor data for subsequent training of the object detection model. The above-mentioned features of the first and second aspect, when applicable, apply to this third aspect as well. In order to avoid undue repetition, reference is made to the above.

According to a fourth aspect, there is provided a computer program product comprising instructions which, when the program is executed by a computing device, causes the computing device to carry out the method according to any embodiment of the third aspect. According to an alternative embodiment of the fourth aspect, there is provided a (non-transitory) computer-readable storage medium. The non-transitory computer-readable storage medium stores one or more programs configured to be executed by one or more processors of a processing system, the one or more programs comprising instructions for performing the method according to any embodiment of the third aspect. The above-mentioned features of the first, second, and third aspect, when applicable, apply to this fourth aspect as well. In order to avoid undue repetition, reference is made to the above.

According to a fifth aspect, there is provided a vehicle enabled for collecting data for subsequent training of an object detection model configured to detect objects in a surrounding environment of a vehicle. The vehicle comprises one or more sensors. The vehicle further comprises control circuitry configured to, in response to detecting an evasive maneuver of the vehicle or a further road user, obtain sensor data pertaining to a scene at which the evasive maneuver was detected. The control circuitry is further configured to determine, by the object detection model, whether an object is detected in the scene based on the sensor data. The control circuitry is further configured to, in response to no object being detected, store the sensor data for subsequent training of the object detection model. The above-mentioned features of the first through fourth aspect, when applicable, apply to this fifth aspect as well. In order to avoid undue repetition, reference is made to the above.

According to a sixth aspect, there is provided a server for collecting data for subsequent training of an object detection model of an automated driving system. The server comprises control circuitry configured to receive, from a vehicle, data indicative of having detected an evasive maneuver by the vehicle or a further road user, despite no object being detected by the object detection model in a scene at which the evasive maneuver was detected. The control circuitry is further configured to receive sensor data pertaining to the scene at which the evasive maneuver was detected. The control circuitry is further configured to store the sensor data for subsequent training of the object detection model. The above-mentioned features of the first through fifth aspect, when applicable, apply to this sixth aspect as well. In order to avoid undue repetition, reference is made to the above.

According to a seventh aspect, there is provided a method for training an object detection model. The method comprises obtaining a training dataset comprising data for training the object detection model collected by the method according to any embodiment of the first or third aspect. The method further comprises training the object detection model on the obtained training dataset. The step of training the object detection model is performed in a server, or in a vehicle. The above-mentioned features of the first through sixth aspect, when applicable, apply to this seventh aspect as well. In order to avoid undue repetition, reference is made to the above.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will, in the following, be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

Figure 1:
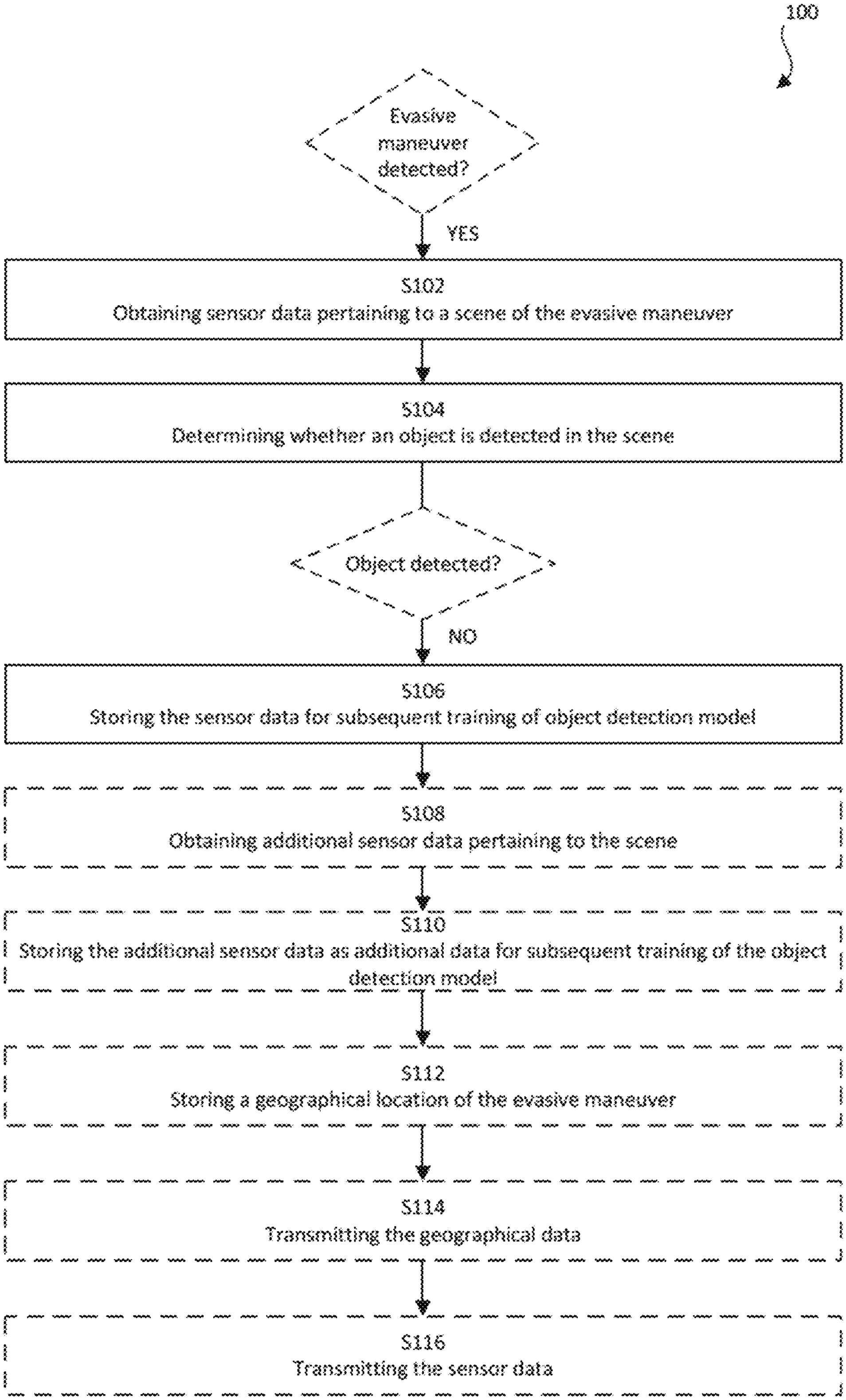
FIG. 1 is a schematic flowchart representation of a method, performed by a vehicle, for collecting data for subsequent training of an object detection model of an automated driving system in accordance with some embodiments.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first element could be termed a second element, and, similarly, a second element could be termed a first element, without departing from the scope of the embodiments. The first element and the second element are both elements, but they are not the same element.

As used herein, the wording "one or more of" a set of elements (as in "one or more of A, B and C" or "at least one of A, B and C") is to be interpreted as either a conjunctive or disjunctive logic. Put differently, it may refer either to all elements, one element or combination of two or more elements of a set of elements. For example, the wording "one or more of A, B and C" may be interpreted as A or B or C, A and B and C, A and B, B and C, or A and C.

Current solutions for object detection in autonomous (or semi-autonomous) vehicles, typically leverage deep learning algorithms of some sort. Throughout the present disclosure, reference is made to object detection models, by which a machine-learning model (may also be referred to as machine-learning algorithm, neural networks, and so forth) based on such algorithms is meant. More specifically, an "object detection model" herein refers to a computational system or algorithm designed to identify and locate instances of specific objects within digital images, video frames, LIDAR data, or other types of data. The model may employ a combination of advanced techniques from computer vision, machine learning, and pattern recognition to analyze visual data and output bounding boxes or regions of interest around objects of interest present in the input imagery. The object detection model may be further configured to classify what type of object is detected. The object detection model may encompass different architectures, including but not limited to convolutional neural networks (CNNs), recurrent neural networks (RNNs), transformers, and other existing or future alternatives.

The deployment of an object detection model typically involves a training phase where the model learns from labeled training data to achieve accurate object localization and/or classification during the subsequent inference or detection phase. The training data (and input data during inference) may e.g. be an image, or sequence of images, LIDAR data (i.e., a point cloud), radar data etc. Furthermore, the training/input data may comprise a combination or fusion of one or more different data types. The training/input data may for instance comprise both an image depicting an annotated object and corresponding LIDAR point cloud comprising the same annotated object.

The machine learning models may be implemented in some embodiments using publicly available suitable software development machine learning code elements, for example, such as those which are available in PyTorch®, TensorFlow®, and Keras®, or in any other suitable software development platform, in any manner known to be suitable to someone of ordinary skill in the art.

FIG. 1 is a schematic flowchart representation of a method 100 for collecting data for subsequent training of an object detection model of an automated driving system (ADS). The collected data can thus be used for training the object detection model. In the following, the wording "data for subsequent training" will be referred to as "training data" for ease of reference. Moreover, even though it is referred to as "training data", it is to be appreciated that it may encompass labelled (also referred to as annotated) data and/or data which has not yet been labelled/annotated. In the case of the latter, the data may be labelled/annotated in a subsequent step, before being used in the training of the object detection model.

Figure 4:
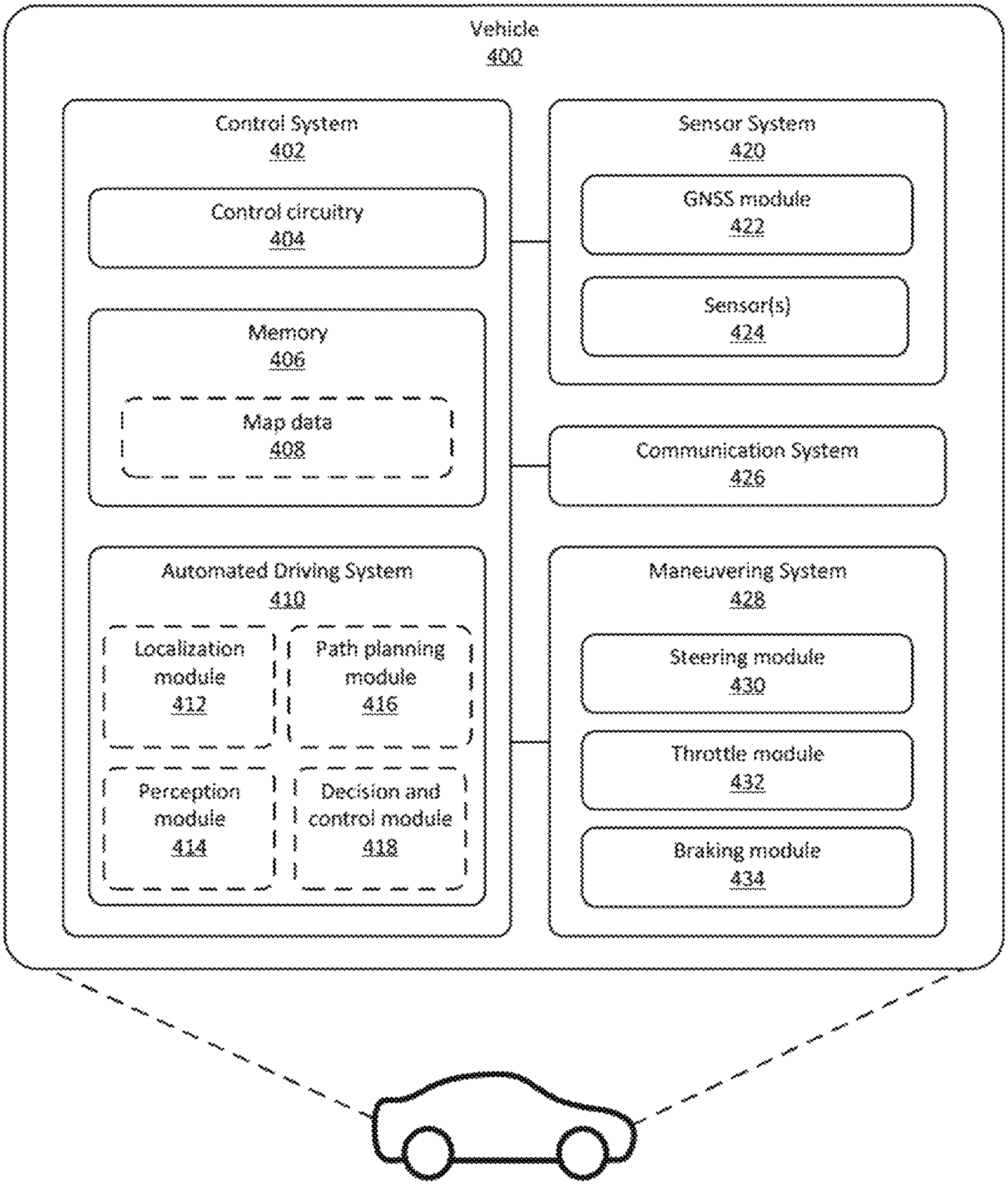
FIG. 4 is a schematic illustration of a vehicle in accordance with some embodiments.
Figure 7A:
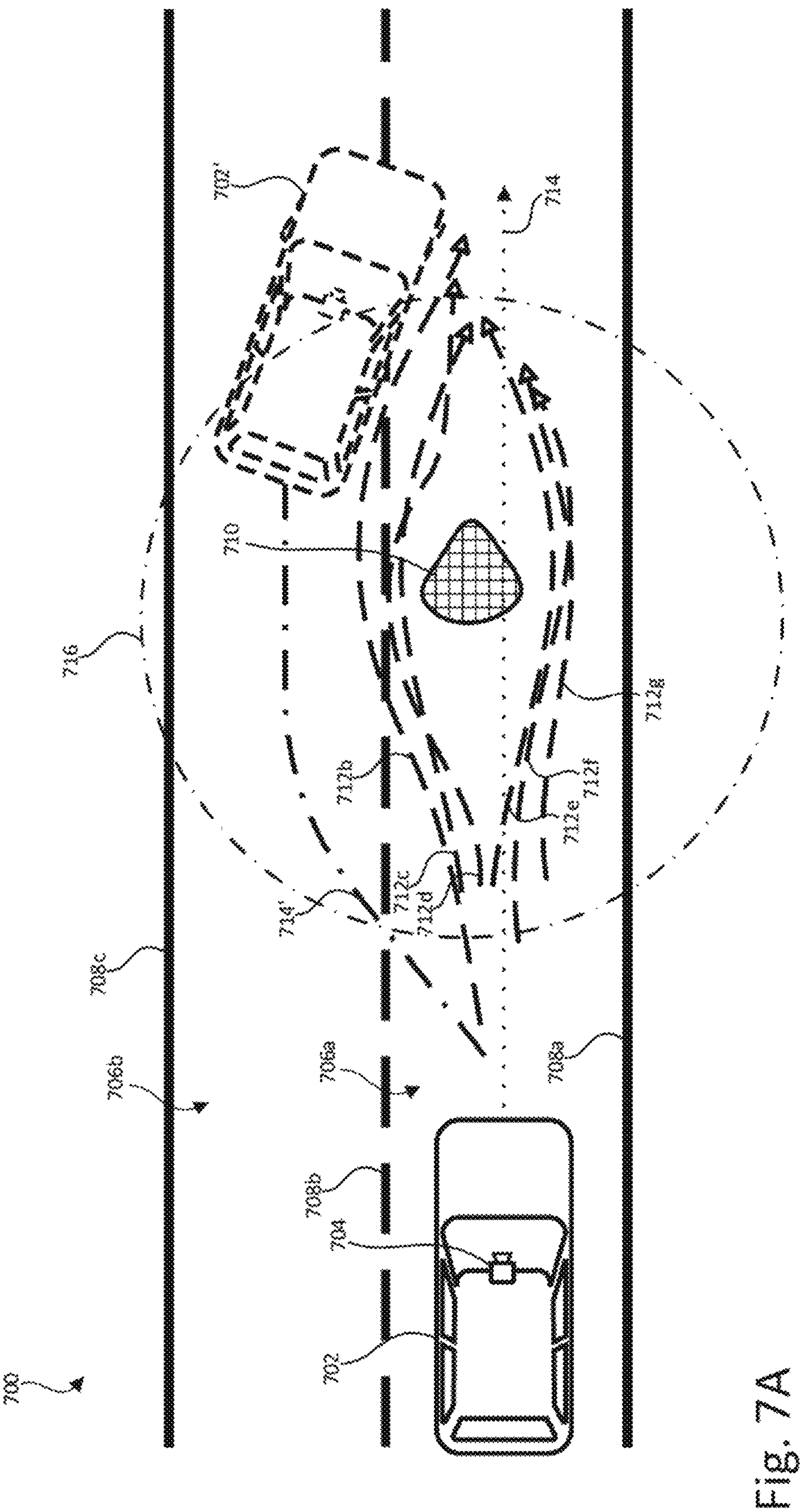
FIGS. 7A and 7B schematically illustrate, by way of example, a first and a second driving scenario in which an evasive maneuver is detected.
Figure 7B:
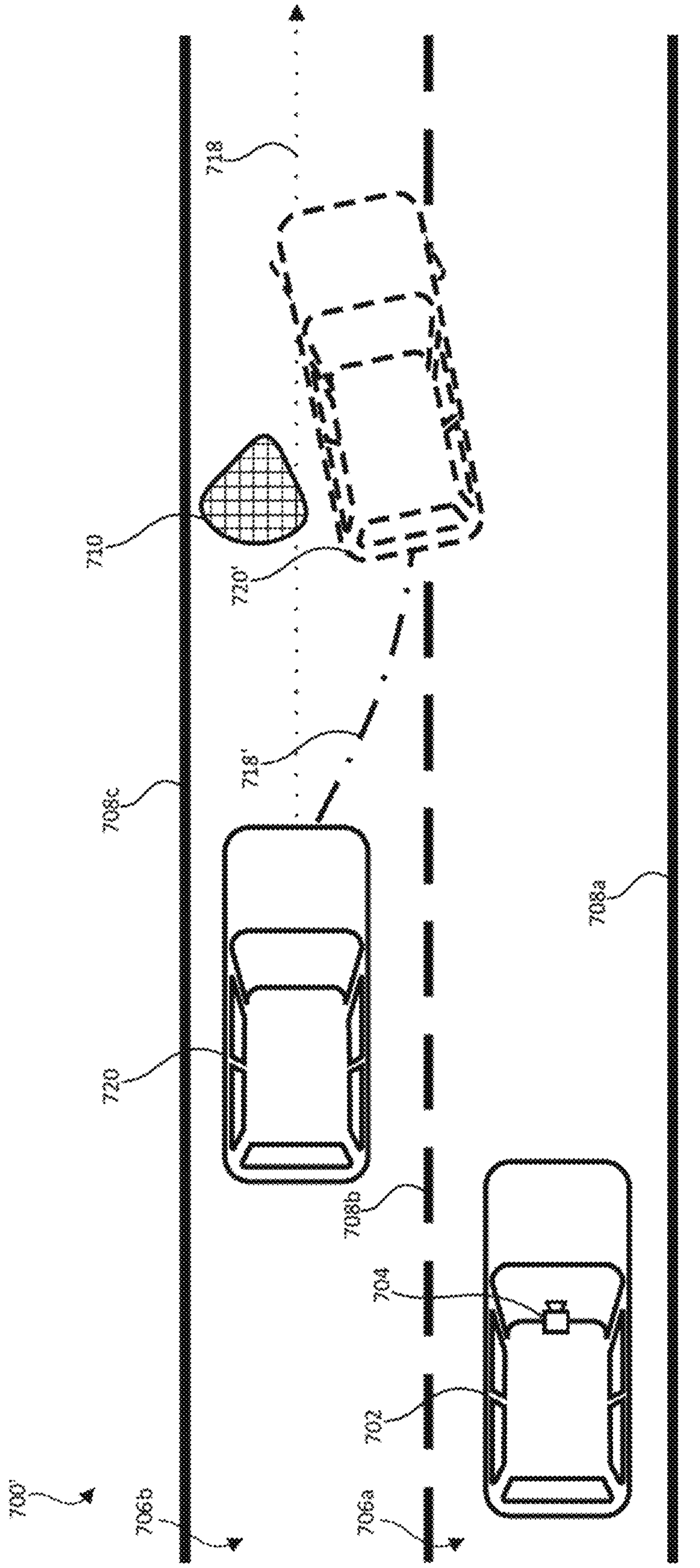

The method 100 may in particular be used to detect training data of rare or unexpected objects in a road environment, such as debris or other kinds of obstacles or obstructing objects. The method 100 can be performed by a vehicle. In other words, the method 100 may be executed by a computing device provided locally in the vehicle, such as by an automated driving system of the vehicle. Such a vehicle will be further described in connection with FIG. 4, by way of example. As used herein, a "vehicle" is any form of motorized transport. For example, the vehicle may be any road vehicle such as a car (as illustrated in FIGS. 4 and FIGS. 7A and 7B), a motorcycle, a (cargo) truck, a bus, etc.

Below, the different steps of the method 100 are described in more detail. Even though illustrated in a specific order, the steps of the method 100 may be performed in any suitable order as well as multiple times. Thus, although FIG. 1 may show a specific order of method steps, the order of the steps may differ from what is depicted. In addition, two or more steps may be performed concurrently or with partial concurrence. For example, the steps denoted S106 to S116 may be performed in any order or at any point in time, based on a specific realization. Such variation will depend on the software and hardware systems chosen and on designer choice. All such variations are within the scope of the invention. Likewise, software implementations could be accomplished with standard programming techniques with rule-based logic and other logic to accomplish the various steps. Further variants of the method 100 will become apparent from the present disclosure. The above mentioned and described embodiments are only given as examples and should not be limiting to the present invention. Other solutions, uses, objectives, and functions within the scope of the invention as claimed below described patent claims should be apparent for the person skilled in the art.

The method 100 comprises in response to detecting an evasive maneuver of the vehicle or a further road user, obtaining S102 sensor data pertaining to a scene at which the evasive maneuver was detected.

The scene may be understood as a general area at which the evasive maneuver was performed. Put differently, the scene can be seen as a physical environment at which the evasive maneuver was detected. Thus, the scene comprises any potential object that may be the cause for the evasive maneuver, i.e. any object which the vehicle (or the driver) tried to avoid by performing the evasive maneuver.

The sensor data pertains to the scene in the sense that the sensor data reflects one or more properties of the scene. Put differently, the sensor data comprises information relating to the scene. The sensor data pertaining to the scene may be any type of data relating to the scene. For example, the sensor data may comprise one or more of image data, LIDAR data, radar data, and ultrasonic data. The image data should herein be understood as one or more images, depicting the scene at which the evasive maneuver was performed. Thus, the image may depict any object present at the scene. The one or more images may constitute a sequence of images. In other words, each image of the sequence of images may depict the scene at different points in time, and/or from different point of views. The sequence of images may thus be understood as a sequence of frames of a video of the scene. Alternatively, the one or more images may constitute a number of images captured by at least two different cameras. Thus, the number of images may depict the scene from different points of view. The sensor data may further comprise information relating to the evasive steering maneuver, such as inertial measurement data, or a path of the evasive maneuver.

The wording "evasive maneuver", as used in the context of this patent application, refers to a movement action undertaken by the vehicle for the purpose of avoiding a collision, a potential obstacle, obstruction, hazardous situation, or the like. The evasive maneuver may e.g. be an abrupt deviation from a current travelling direction. The evasive maneuver can involve a dynamic adjustment of the vehicle's speed (i.e. by increasing the speed or braking) and/or its trajectory. In some embodiments, the evasive maneuver is an evasive steering maneuver. Put differently, the evasive maneuver may be achieved by adjusting a trajectory of the vehicle.

The evasive maneuver may be a maneuver deviating from an expected trajectory of the vehicle or the further road user. In other words, the evasive maneuver may be detected as a deviation of the vehicle from the expected trajectory of the vehicle or the further road user. The expected trajectory herein refers to a predicted or planned path or motion that the vehicle is anticipated to follow in a given environment or driving scenario. The expected trajectory may be determined based on a machine-learning based trajectory prediction of the ego-vehicle. The expected trajectory can be formed based on various factors of the vehicle, including, but not limited to, sensor data, map or location data, vehicle dynamics, a planned route, behavior prediction, and real-time decision-making algorithms. The sensor data may provide information about the vehicle's surroundings, i.e. how the vehicle perceives its surrounding environment. The surrounding environment of a vehicle is to be understood as a general area around the vehicle in which objects (such as other vehicles, landmarks, obstacles, etc.) can be detected and identified by vehicle sensors (RADAR, LIDAR, cameras, etc.), i.e. within a sensor range of the vehicle. Thus, the sensor data may give information about the position of other vehicles, pedestrians, obstacles, road conditions, and more. It may further give information about the direction of the lane or road in which the vehicle is travelling. Map or location data may provide additional information about how the vehicle can be expected to navigate. Vehicle dynamics may provide information about how the vehicle is driving, in terms of velocity, acceleration, etc. The planned route may be based on a destination of the vehicle, and provide information about what route, and/or lane the vehicle is expected to drive along. Behavior prediction may e.g. be based on a driving scenario, such as driving along a highway. In such a case, the vehicle can be expected to travel at a certain speed and along a certain lane so that any deviations from that can be indicative of an evasive maneuver. Behavior prediction may also be related to driving characteristics of the driver. Real-time decision-making refers to how the vehicle (either the driver or the autonomous driving system) reacts to sudden changes in the driving scenario, which may cause a change in the expected trajectory of the vehicle, such as a planned lane change. Described above are some examples of how the expected trajectory may be determined, and/or how an evasive maneuver may be detected. In the following, some further examples will be given.

The expected trajectory may be based on a current lane of the vehicle. More specifically, the expected trajectory may be that the vehicle continues to travel in the current lane. An evasive maneuver may then be detected if the vehicle deviates from a center of the lane, crossing a lane marker, or temporarily changes lanes (e.g. switching to an adjacent lane, and then back to the previous lane). In another example, the expected trajectory may be a planned lane change, indicated e.g. by the driver using a turn signal, or by the planned path of the automated driving system. An evasive maneuver may then be detected if the planned lane change is terminated.

In conclusion, the expected trajectory of the vehicle may be seen as a dynamic and calculated path that considers several factors relating to the vehicle.

In some embodiments, the expected trajectory is formed based on a lane estimation model. The lane estimation model herein refers to a computational algorithm or system configured to detect and track the location and boundaries of lanes on the road. The lane estimation model may be part of a perception module of an autonomous vehicle, as it enables the vehicle to understand its position within the lane and make appropriate decisions for navigation and control. The evasive maneuver may thus be detected if the vehicle deviated from the lane as predicted by the lane estimation model.

In another example, the evasive maneuver may be detected as an abrupt or sudden change in lateral movement of the vehicle. Thus, detecting the evasive maneuver may be based on a lateral movement of the vehicle or the further road user. The lateral movement of the vehicle or the further road user may e.g. be a lateral acceleration and/or yaw rate of the vehicle. The evasive maneuver may thus be detected as a peak or spike in lateral acceleration and/or yaw rate.

As is readily understood by the person skilled in the art, other ways of forming the expected trajectory, or detecting the evasive maneuver of the vehicle from those explained above, are achievable as well. The presently disclosed technology is not limited by the examples given above, but include also such other ways. Illustrative examples of this is further given below in connection with FIGS. 7A and 7B.

The evasive maneuver may be caused by driver inputs. Put differently, a driver of the vehicle may perform the evasive maneuver by adjusting a steering input, a gas input, and/or brake input. Alternatively, the evasive maneuver may be caused by a control system of the vehicle. For example, the ADS of the vehicle may perform the evasive maneuver by adjusting the steering input, gas input and/or brake input according to a determined control strategy. A different sub-system of the ADS may then detect the evasive maneuver. Alternatively, or in combination, the evasive maneuver may be braking of the vehicle. The evasive maneuver may be initiated by a driver of the vehicle or by the automated driving system.

As stated above, the evasive maneuver may be detected by the vehicle itself (also referred to as the ego-vehicle). In such a case, the evasive maneuver may be detected based on on-board sensors of the vehicle. The on-board sensors may collect sensor data about the vehicle itself, such as vehicle dynamics properties (e.g. direction, speed, acceleration, or other inertial measurement data). The on-board sensors may further collect sensor data about the surrounding environment of the vehicle, such as cameras, LIDAR, radar, and or ultrasonic sensors.

Alternatively, the ego-vehicle may detect an evasive maneuver of another road user, such as another vehicle, which is observed by the ego-vehicle. In such a case, the evasive maneuver is detected by the ego-vehicle based on sensors configured to collect sensor data about its surroundings, such as cameras, LIDAR, radar, and or ultrasonic sensors.

Moving on, the method 100 further comprises determining S104, by the object detection model, whether an object is detected in the scene based on the sensor data. Put differently, the obtained sensor data may be inputted to the object detection model, which determines whether an object is present in the scene, or not. By the object being present in the scene, should herein be understood as the object being present at the location of the evasive maneuver. In other words, the step denoted by S104 may be understood as determining whether an object which may be the cause for the evasive maneuver is detected. Put differently, it may be determined S104 whether an object is present at the location which the vehicle (or driver) avoided by performing the evasive maneuver. By object, it is herein meant any type of obstacle that may be present in the road. The object may in particular be any type of object that may pose a potential hazard to either drivers or other road users, as it may obstruct traffic, cause accidents, or damage vehicles. The object may for instance be road debris. Examples of road debris include items such as litter, fallen branches, rocks, tire fragments, fallen off vehicle parts, road-kill, construction materials, and other objects that are not typically part of the road infrastructure. Further, the object may be a damage to the road surface, such as a pothole, a crack, or a sharp edge. Furthermore, the object can be a puddle of water, a snowdrift, a spot of ice, or the like, which the driver may want to avoid.

The method 100 further comprises, in response to no object being detected, storing S106 the sensor data as training data for the object detection model. Put differently, in case the object detection model fails to detect an object at the scene of the evasive maneuver, the sensor data is stored as training data for the object detection model. The method may further comprise storing free-space estimation data associated with the scene. The free-space estimation data may provide further indications whether it is likely that an object is present or not at the scene of the evasive maneuver. Thus, in a case where the free-space estimation data indicates that an obstruction is present at the scene of the evasive maneuver, this may further increase the likelihood of an object actually being present, despite the object detection model failing to detect such an object. Thus, this may be used to strengthen the signal of the sensor data depicting a rare or new object which the object detection model has not seen before.

Free-space estimation data herein refers to the output of so-called free-space estimation algorithms, which are configured to detect whether there is an obstruction ahead of the vehicle. In other words, the free-space estimation algorithm may provide information about what is occupied space and what is unoccupied space around the vehicle.

The method may further comprise storing a time-stamp associated with the detected evasive maneuver. The time-stamp may indicate a point in time at which the evasive maneuver was detected. The time-stamp may later be used by a server to make decisions based how long ago or how recent a detected evasive maneuver has occurred.

The method 100 may further comprise obtaining S108 additional sensor data pertaining to the scene at which the evasive maneuver was detected. The method may further comprise storing S110 said additional sensor data as additional training data for the object detection model. The additional sensor data may be sensor data captured by the same vehicle but at a different point in time. The sensor data and the additional sensor data may be separated in time by a time frame, or by a longer time gap. Alternatively, or in combination, the additional sensor data may be sensor data captured by the same vehicle but from a different point of view. Thus, the additional sensor data may pertain to the scene from a different point-of-view and/or at a different point-in-time. Even further, the additional sensor data may be a different kind of sensor data than the previously obtained sensor data. Even further, the additional sensor data may be sensor data collected by a different vehicle. Obtaining S108 and storing S110 the additional sensor data enables the collection of more training data of the same instance. In particular, by collecting training data of the scene at different points in time and/or from different points of view provides for an improved training of the object detection model, as it can learn to recognize an object in several different scenes.

Obtaining S108 the additional sensor data, and subsequently storing S110 the additional sensor data as additional training data may be performed in response to receiving a request for such data, e.g. from a server. An example of such a server is further described in connection with FIG. 5.

The method 100 may further comprise transmitting S116 the sensor data pertaining to the scene at which the evasive maneuver was detected to a server. Put differently, the sensor data stored as training data may be transmitted S116 to the server. Transmitting S116 the sensor data to the server may further comprise transmitting the additional sensor data to the server. The vehicle may further transmit the free-space estimation data and/or time stamp associated with the detected evasive maneuver to the server. The sensor data may be transmitted as raw data. Alternatively, the sensor data may be transmitted as fused data, i.e. after being processed in some way.

Transmitting S116 the sensor data may be performed in response to receiving a request from the server. The request sent from the server is further described e.g. in connection with FIG. 2. This may be advantageous in that it provides for more effective data handling/transmission.

The method 100 may further comprise storing S112 a geographical location of the scene at which the evasive maneuver was detected. Put differently, the geographical location at which the evasive maneuver was performed may be stored S112. By geographical location, it is herein meant any form of geographical position data, such as a position in a global coordinate system (e.g. as GPS coordinates), or a position in a local coordinate system, such as a position on a map.

The method 100 may further comprise transmitting S114 the geographical data to the server. As will be further explained below in connection with FIG. 6, the transmitted geographical location may trigger the server to send the request for sensor data pertaining to the scene at which the evasive maneuver was detected. The vehicle may then transmit the sensor data in response to receiving that request.

Executable instructions for performing these functions are, optionally, included in a non-transitory computer-readable storage medium or other computer program product configured for execution by one or more processors.

Generally speaking, a computer-accessible medium may include any tangible or non-transitory storage media or memory media such as electronic, magnetic, or optical media—e.g., disk or CD/DVD-ROM coupled to computer system via bus. The terms “tangible” and “non-transitory,” as used herein, are intended to describe a computer-readable storage medium (or “memory”) excluding propagating electromagnetic signals, but are not intended to otherwise limit the type of physical computer-readable storage device that is encompassed by the phrase computer-readable medium or memory. For instance, the terms “non-transitory computer-readable medium” or “tangible memory” are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Figure 2:
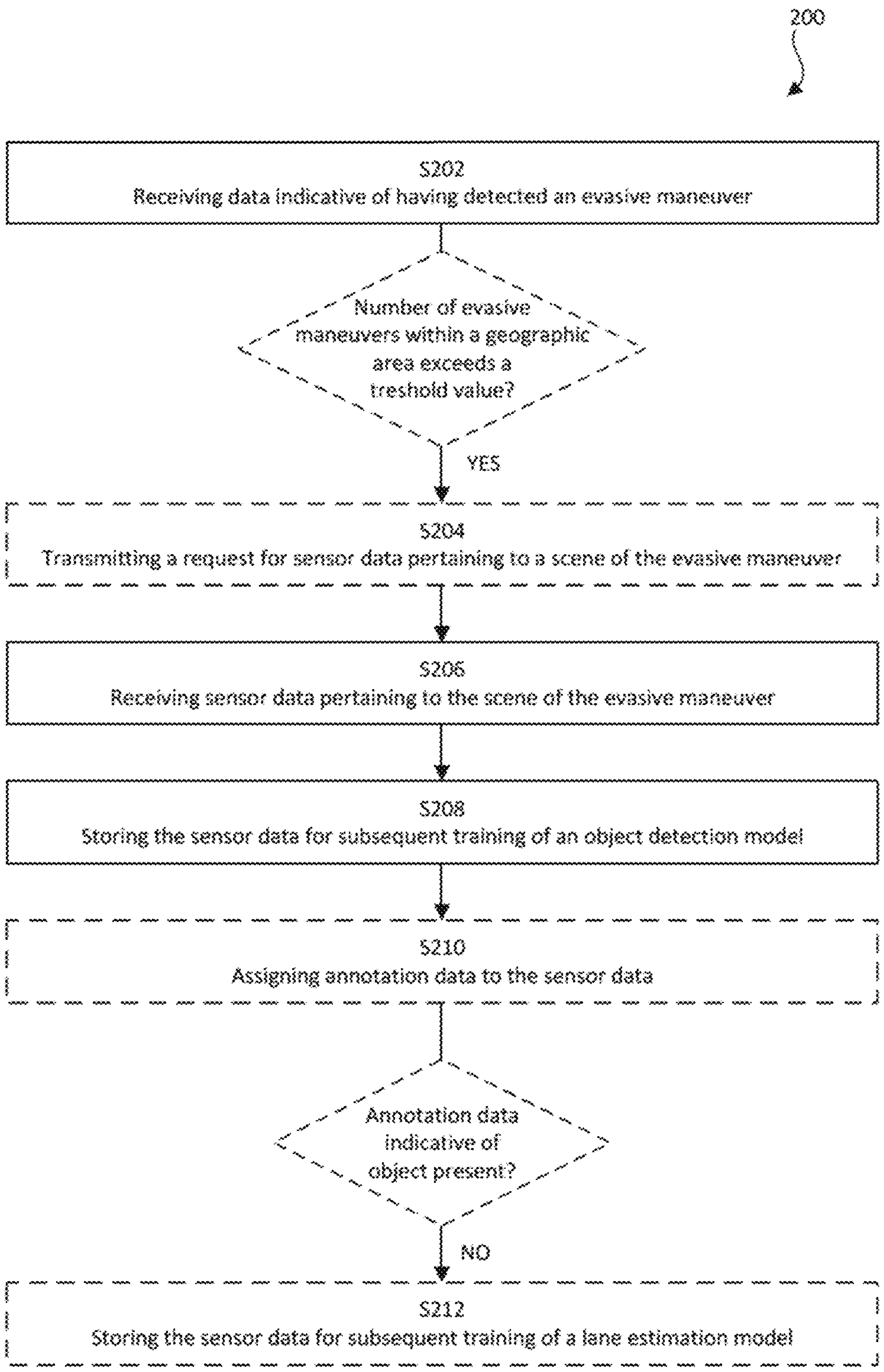
FIG. 2 is a schematic flowchart representation of a method, performed by a server for collecting data for subsequent training of an object detection model of an automated driving system in accordance with some embodiments.

FIG. 2 is a schematic flowchart representation of a method 200, performed by a server, for collecting training data for an object detection model of an automated driving system in accordance with some embodiments. The server may be communicatively connected to one or more vehicles enabled to perform the method 100 as described in the forgoing with reference to FIG. 1. Such a server is further described below in connection with FIG. 5.

Below, the different steps of the method 200 are described in more detail. Even though illustrated in a specific order, the steps of the method 200 may be performed in any suitable order as well as multiple times. Thus, although FIG. 2 may show a specific order of method steps, the order of the steps may differ from what is depicted. In addition, two or more steps may be performed concurrently or with partial concurrence. Such variations will depend on the software and hardware systems chosen and on designer choice. All such variations are within the scope of the invention. Likewise, software implementations could be accomplished with standard programming techniques with rule-based logic and other logic to accomplish the various steps. The above mentioned and described embodiments are only given as examples and should not be limiting to the present invention. Other solutions, uses, objectives, and functions within the scope of the invention as claimed in the below described patent claims should be apparent for the person skilled in the art.

The method comprises receiving S202, from a vehicle, data indicative of having detected an evasive maneuver of the vehicle or a further road user, despite no object being detected by the object detection model in the scene at which the evasive maneuver was detected. The received data may e.g. be a flag by the vehicle which indicates that the evasive maneuver has been detected and that the object detection model of the automated driving system of the vehicle did not detect an object at the scene. In some embodiments, the data indicative of having detected the evasive maneuver of the vehicle or of the further road user further comprises a geographical location at which the evasive maneuver was detected. The data indicative of having detected the evasive maneuver of the vehicle or of the further road user may further comprise a time-stamp. The time-stamp may indicate when the evasive maneuver was detected.

The method further comprises receiving S206 sensor data pertaining to the scene at which the evasive maneuver was detected. The sensor data may be received S206 from the vehicle. In some embodiments, the sensor data is image data. Put differently, the sensor data may be one or more images depicting the scene. However, as explained in the foregoing with reference to FIG. 1, the sensor data may comprise one or more types of data, including but not limited to LIDAR data, radar data, and ultrasonic data. The sensor data pertaining to the scene at which the evasive maneuver was detected may be received S206 in response to transmitting S204 a request for the sensor data to the vehicle. The method 200 may further comprise transmitting a request for additional sensor data pertaining to the scene at which the evasive maneuver was detected. Thereby, more potential training data of the scene may be collected.

The method further comprises storing S208 the sensor data as training data for the object detection model.

In some embodiments, transmitting S204 the request for the sensor data is performed in response to a number of evasive maneuvers detected at geographic locations within a defined geographic area exceeding a threshold value. Put differently, the server may collect instances of detected evasive maneuvers from one or more vehicles. Geographical locations of these instances may be stored by the server. Once a number of evasive maneuvers associated with geographical locations falling within a defined geographic area exceeds the threshold value, the server may transmit S204 the request for the sensor data to the vehicle. In case more than one evasive maneuver occurs at generally the same area by different road users, this can be used as a signal that the likelihood of an object or obstacle of any sort being present at that location increases. Thus, by employing a threshold value of the number of detected evasive maneuvers before requesting the sensor data, the reliability of the method, i.e. in the sense of collecting relevant training data, can be increased. In other words, the threshold value may provide for strengthening the signal of an object being present at the location. The threshold value may be a user-defined or pre-defined threshold value. Further, the time-stamp associated with each detected evasive maneuver may be used to disregard any irrelevant detections of evasive maneuvers, e.g. for being too old to be caused by the same obstructing object.

The request for the sensor data pertaining to the scene of the detected evasive maneuver may be transmitted S204 to the vehicle having detected the evasive maneuver. In other words, the request may be transmitted S204 to the vehicle which caused the threshold value to be exceeded. Alternatively, or additionally, the request may be transmitted S204 to a subsequent vehicle which is about to pass the geographical area. Thus, the subsequent vehicle may be instructed to collect sensor data of a scene at the geographical area, and transmit the collected sensor data to the server. Even further, the server may transmit S204 the request to one or more of the vehicles having detected evasive maneuvers at the geographical area, prior to the threshold value being exceeded. Any vehicles having stored sensor data pertaining to the scene may then transmit this data to the server.

The geographical area may be understood as an area comprising a plurality of geographical locations. The geographical area may e.g. be defined as a certain area. In other words, the threshold value may be exceeded in case a certain number of evasive maneuvers are detected at geographical locations being within a certain distance from each other. By employing the geographical area, any inaccuracies in the geographical location of the evasive maneuvers can be dealt with appropriately. For example, in a real world scenario, no two geographical locations of detected evasive maneuvers will likely be exactly the same.

The method 200 may further comprise assigning S210 annotation data to the sensor data. The annotation data may be data specifying whether an object is present at the scene to which the sensor data pertains. The annotation data may further specify a type of the object. The annotation data may e.g. be a label stating object/no object, or a label stating what type of object it is. The annotation data may further comprise a bounding box or segmentation data specifying where in the sensor data (e.g. where in in the image) the object is present. The annotation data may be assigned based on a user input. The annotation data may thus be manually generated data. In some embodiments, the annotation data may be generated based on an annotation algorithm different from the object detection model to be trained using the training data.

Storing S208 the sensor data as training data for the object detection model may be performed in response to the annotation data being indicative of an object being present in the scene. In such case, the annotation data can be used to verify that an object is present at the scene, despite the object detection model failing to detect an object. Further, the annotation data may be used as a ground truth for the sensor data during training of the object detection model.

In response to the annotation data being indicative of no object being present in the scene, the method 200 may further comprise storing S212 the sensor data as training data for a lane estimation model of the automated driving system. As explained in the foregoing, the evasive maneuver may be detected based on a lane estimation model. Thus, in case the annotation data is indicative of no object being present, the object detection model can be assumed to correctly having detected no object at the scene. This case may indicate that the evasive maneuver was detected by mistake, e.g. due to a scenario in which the lane estimation model fails to correctly estimate the lane. Thereby, the sensor data pertaining to the scene can be stored as training data for the lane estimation model instead of for the object detection model. The method 100 may thus be described as a method 100 for collecting training data for an object detection model or a lane estimation model for an automated driving system.

Executable instructions for performing these functions are, optionally, included in a non-transitory computer-readable storage medium or other computer program product configured for execution by one or more processors.

Figure 3:
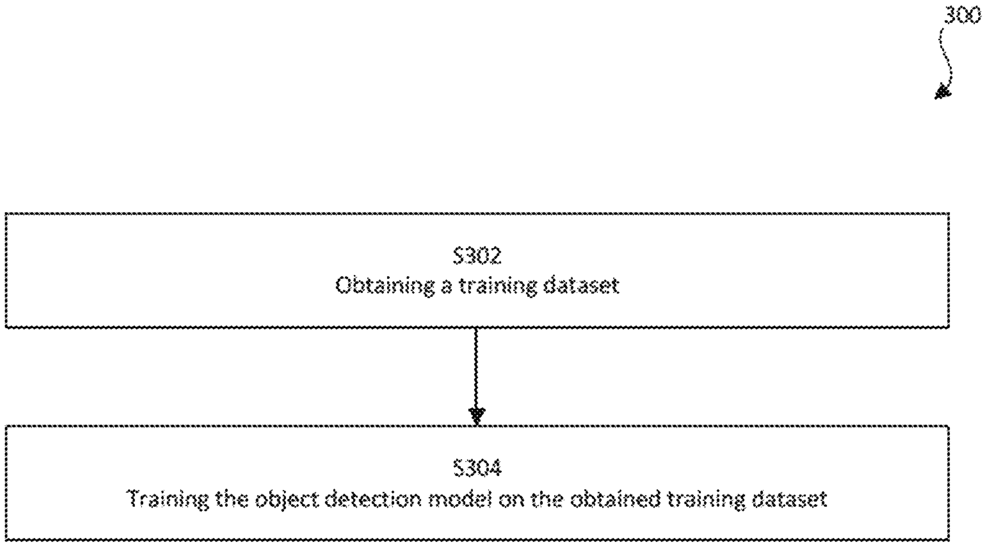
FIG. 3 is a schematic flowchart representation of a method for training an object detection model in accordance with some embodiments.

FIG. 3 is a schematic flowchart representation of a method for training an object detection model in accordance with some embodiments. In the following, the different steps are described in more detail. As stated above, the object detection model should throughout the present disclosure be understood as a machine-learning model for detecting and/or classifying objects.

The wording "training" herein refers to the process of teaching the machine-learning model to recognize patterns and relationships in a dataset, or more specifically, to detect/classify/recognize objects in images and/or other types of data. The training process may refer to training of a new machine-learning model from scratch. However, the process may also refer to re-training of an existing machine-learning model or fine-tuning of an existing model.

Re-training of a machine-learning model refers to the process of updating an existing model with a new or updated dataset. Re-training the model may involve training the model from scratch, with training data comprising the new data (in this case the training data collected by the techniques described in the foregoing). Alternatively, re-training the model may involve training the already trained model on the new data only. The aim of re-training may be to improve the model's accuracy and generalization ability on new, unseen data, or rare data that the model has not seen as often.

Re-training may also be necessary when the original training data is no longer representative of the real-world data, or when the model's performance has decreased due to changes in the data distribution. Re-training may also be necessary when the model needs to be adapted to a new task or application.

The re-training process involves several steps, similar to an initial training process. The new data is added to the existing dataset, and the model is retrained using the updated data. Depending on the extent of the changes in the data, the model may need to be modified or reconfigured before retraining.

Fine-tuning of a machine-learning model refers to the process of training a pre-trained model, already trained for a different task or on different data, on the new data. Fine-tuning may involve training a part of the pre-trained model (e.g. the last few layers), the entire model, or replacing or adding new layers and training only the new layers. The pre-trained model may for instance be a generic machine-learning model, which after fine-tuning, is adapted for a new task for a new domain.

According to a seventh aspect, there is provided a method for training an object detection model. The method comprises obtaining a training dataset comprising training data collected by the method according to any embodiment of the first or third aspect. The method further comprises training the object detection model on the obtained training dataset. The step of training the object detection model is performed in a server, or in a vehicle. The above-mentioned features of the first through sixth aspect, when applicable, apply to this seventh aspect as well. In order to avoid undue repetition, reference is made to the above.

The method 300 comprises obtaining S302 a training dataset comprising training data collected by the method 100 described above in connection with FIG. 1, and/or by the method 200 described above in connection with FIG. 2.

The term "obtaining" is throughout the present disclosure to be interpreted broadly and encompasses receiving, retrieving, collecting, acquiring, and so forth directly and/or indirectly between two entities configured to be in communication with each other or further with other external entities. However, in some embodiments, the term "obtaining" is to be construed as determining, deriving, forming, computing, etc. In other words, obtaining a training dataset may encompass collecting, determining, computing or generating the training dataset, e.g. by performing the method 100 described in connection with FIG. 1 and/or the method 200 described in connection with FIG. 2. Alternatively, the training dataset may be received e.g. from another entity, or from a memory or database where the training dataset is stored. Thus, as used herein, "obtaining" may indicate that a parameter is received at a first entity/unit from a second entity/unit, or that the parameter is determined at the first entity/unit e.g. based on data received from another entity/unit.

The method 300 further comprises training S304 the object detection model on the obtained training dataset. Training S304 the object detection model may be done according to any suitable process as readily understood by the skilled person. For example, the object detection model may be trained S304 using supervised leaning where each instance of the training dataset has an associated label stating that an object is present, and/or what type of object it is.

The step of training S304 the object detection model may be performed in a server, such as the server further described in connection with FIG. 5. Alternatively, the step of training S304 the object detection model may be performed in a vehicle, such as the vehicle described in connection with FIG. 4. The training of the object detection model will be further described below in connection with FIG. 6.

The method 300 may further comprise transmitting the trained object detection model to the server, in case it was trained in the vehicle. Alternatively, the method 300 may further comprise transmitting the trained object detection model to the vehicle, in case it was trained in the server.

Executable instructions for performing these functions are, optionally, included in a non-transitory computer-readable storage medium or other computer program product configured for execution by one or more processors.

FIG. 4 is a schematic illustration of a vehicle 400 in accordance with some embodiments. The vehicle 400 is equipped with an Automated Driving System (ADS) 410. As used herein, a "vehicle" is any form of motorized transport. For example, the vehicle 400 may be any road vehicle such as a car (as illustrated herein), a motorcycle, a (cargo) truck, a bus, a smart bicycle, etc.

The vehicle 400 comprises a number of elements which can be commonly found in autonomous or semi-autonomous vehicles. It will be understood that the vehicle 400 can have any combination of the various elements shown in FIG. 4. Moreover, the vehicle 400 may comprise further elements than those shown in FIG. 4. While the various elements is herein shown as located inside the vehicle 400, one or more of the elements can be located externally to the vehicle 400. Further, even though the various elements are herein depicted in a certain arrangement, the various elements may also be implemented in different arrangements, as readily understood by the skilled person. It should be further noted that the various elements may be communicatively connected to each other in any suitable way. The vehicle 400 of FIG. 4 should be seen merely as an illustrative example, as the elements of the vehicle 400 can be realized in several different ways.

The vehicle 400 comprises a control system 402. The control system 402 is configured to carry out overall control of functions and operations of the vehicle 400. The control system 402 comprises control circuitry 404 and a memory 406. The control circuitry 402 may physically comprise one single circuitry device. Alternatively, the control circuitry 402 may be distributed over several circuitry devices. As an example, the control system 402 may share its control circuitry 404 with other parts of the vehicle. The control circuitry 402 may comprise one or more processors, such as a central processing unit (CPU), microcontroller, or microprocessor. The one or more processors may be configured to execute program code stored in the memory 406, in order to carry out functions and operations of the vehicle 400. The processor(s) may be or include any number of hardware components for conducting data or signal processing or for executing computer code stored in the memory 406. In some embodiments, the control circuitry 404, or some functions thereof, may be implemented on one or more so-called system-on-a-chips (SoC). As an example, the ADS 410 may be implemented on a SoC. The memory 406 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 406 may include database components, object code components, script components, or any other type of information structure for supporting the various activities of the present description.

In the illustrated example, the memory 406 further stores map data 408. The map data 408 may for instance be used by the ADS 410 of the vehicle 400 in order to perform autonomous functions of the vehicle 400. The map data 408 may comprise high-definition (HD) map data. It is contemplated that the memory 408, even though illustrated as a separate element from the ADS 410, may be provided as an integral element of the ADS 410. In other words, according to some embodiments, any distributed or local memory device may be utilized in the realization of the present inventive concept. Similarly, the control circuitry 404 may be distributed e.g. such that one or more processors of the control circuitry 404 is provided as integral elements of the ADS 410 or any other system of the vehicle 400. In other words, according to an exemplary embodiment, any distributed or local control circuitry device may be utilized in the realization of the present inventive concept.

The vehicle 400 further comprises a sensor system 420. The sensor system 420 is configured to acquire sensory data about the vehicle itself, or of its surroundings. The sensor system 420 may for example comprise a Global Navigation Satellite System (GNSS) module 422 (such as a GPS) configured to collect geographical position data of the vehicle 400. The sensor system 420 may further comprise one or more sensors 424. The one or more sensor(s) 424 may be any type of on-board sensors, such as cameras, LIDARs and RADARs, ultrasonic sensors, gyroscopes, accelerometers, odometers etc. It should be appreciated that the sensor system 420 may also provide the possibility to acquire sensory data directly or via dedicated sensor control circuitry in the vehicle 400.

The vehicle 400 further comprises a communication system 426. The communication system 426 is configured to communicate with external units, such as other vehicles (i.e. via vehicle-to-vehicle (V2V) communication protocols), remote servers (e.g. cloud servers, as explained further below in connection with FIG. 5), databases or other external devices, i.e. vehicle-to-infrastructure (V2I) or vehicle-to-everything (V2X) communication protocols. The communication system 426 may communicate using one or more communication technologies. The communication system 426 may comprise one or more antennas. Cellular communication technologies may be used for long-range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short-range communication technologies may be used such as Wireless Local Area (LAN), e.g. IEEE 802.11 based solutions, for communicating with other vehicles in the vicinity of the vehicle 400 or with local infrastructure elements. ETSI is working on cellular standards for vehicle communication and for instance 5G is considered as a suitable solution due to the low latency and efficient handling of high bandwidths and communication channels.

The communication system 426 may further provide the possibility to send output to a remote location (e.g. remote operator or control center) by means of the one or more antennas. Moreover, the communication system 426 may be further configured to allow the various elements of the vehicle 400 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa, Zigbee, Bluetooth, or similar mid/short range technologies.

The vehicle 400 further comprises a maneuvering system 420. The maneuvering system 428 is configured to control the maneuvering of the vehicle 400. The maneuvering system 428 comprises a steering module 430 configured to control the heading of the vehicle 400. The maneuvering system 428 further comprises a throttle module 432 configured to control actuation of the throttle of the vehicle 400. The maneuvering system 428 further comprises a braking module 434 configured to control actuation of the brakes of the vehicle 400. The various modules of the steering system 428 may receive manual input from a driver of the vehicle 400 (i.e. from a steering wheel, a gas pedal and a brake pedal respectively). However, the maneuvering system 428 may be communicatively connected to the ADS 410 of the vehicle, to receive instructions on how the various modules should act. Thus, the ADS 410 can control the maneuvering of the vehicle 400.

As stated above, the vehicle 400 comprises an ADS 410. The ADS 410 may be part of the control system 402 of the vehicle. The ADS 410 is configured to carry out the functions and operations of the autonomous functions of the vehicle 400. The ADS 410 can comprise a number of modules, where each module is tasked with different functions of the ADS 410.

The ADS 410 may comprise a localization module 412 or localization block/system. The localization module 412 is configured to determine and/or monitor a geographical position and heading of the vehicle 400, and may utilize data from the sensor system 420, such as data from the GNSS module 422. Alternatively, or in combination, the localization module 412 may utilize data from the one or more sensors 424. The localization system may alternatively be realized as a Real Time Kinematics (RTK) GPS in order to improve accuracy.

The ADS 410 may further comprise a perception module 414 or perception block/system. The perception module 414 may refer to any commonly known module and/or functionality, e.g. comprised in one or more electronic control modules and/or nodes of the vehicle 400, adapted and/or configured to interpret sensory data-relevant for driving of the vehicle 400—to identify e.g. obstacles, vehicle lanes, relevant signage, appropriate navigation paths etc. The perception module 414 may thus be adapted to rely on and obtain inputs from multiple data sources, such as automotive imaging, image processing, computer vision, and/or in-car networking, etc., in combination with sensory data e.g. from the sensor system 420.

An object detection model for detecting and/or classifying object in the surrounding environment of the vehicle 400 may be part of the ADS 410, or more specifically part of the perception module 414. The vehicle 400 is configured to perform the functions of the method 100 for collecting training data for the object detection model. These functions may be implemented in a separate computing device provided in the vehicle. The computing device may comprise control circuitry configured to perform the steps of the method 100 as described above in connection with FIG. 1. Alternatively, the functions may be distributed over one or more modules, systems, or elements of the vehicle 400, as readily understood by the person skilled in the art. For example, the control circuitry 404 of the control system 402 may be configured to perform the steps of the method 100.

The localization module 412 and/or the perception module 414 may be communicatively connected to the sensor system 420 in order to receive sensor data from the sensor system 420. The localization module 412 and/or the perception module 414 may further transmit control instructions to the sensor system 420.

The ADS may further comprise a path planning module 416. The path planning module 416 is configured to determine a planned path of the vehicle 400 based on a perception and location of the vehicle as determined by the perception module 414 and the localization module 412 respectively. A planned path determined by the path planning module 416 may be sent to the maneuvering system 428 for execution. The planned path may constitute the expected trajectory as explained in the foregoing.

The ADS may further comprise a decision and control module 418. The decision and control module 418 is configured to perform the control and make decisions of the ADS 410. For example, the decision and control module 418 may decide on whether the planned path determined by the path-planning module 416 should be executed or not. The decision and control module 418 may be further configured to detect any evasive maneuvers of the vehicle, such as deviations from the planned path, or expected trajectory of the path planning module 416. This includes both evasive maneuvers performed by the ADS 410 and by a driver of the vehicle. Further, the perception module 414 may be configured to detect an evasive maneuver of another vehicle or road user.

It should be understood that parts of the described solution may be implemented either in the vehicle 400, in a system located external to the vehicle, or in a combination of internal and external to the vehicle; for instance, in a server in communication with the vehicle, a so called cloud solution. The different features and steps of the embodiments may be combined in other combinations than those described. Further, the elements of the vehicle 400 (i.e. the systems and modules) may be implemented in different combinations than those described herein.

Figure 5:
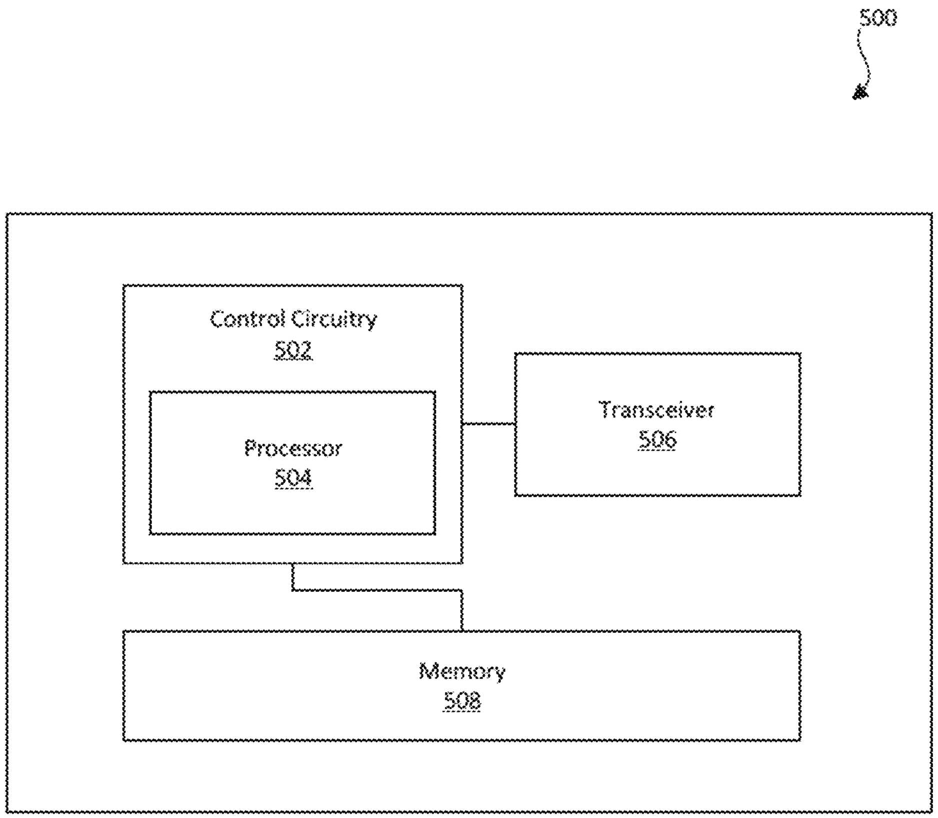
FIG. 5 is a schematic illustration of a server in accordance with some embodiments.

FIG. 5 is a schematic illustration of a server 500, for collecting training data for an object detection model of an automated driving system, in accordance with some embodiments. The server 500 may be configured to perform the method 200 as described in connection with FIG. 2.

The server 500 (may also be referred to as remote server, cloud server, central server, back-office server, fleet server, or back-end server) as described herein for the purpose of this patent application, refers to a computer system or networked device configured to provide various computing services, data storage, processing capabilities, or resources to clients or users over a communication network. In the present case, the wording "clients" refers to connected vehicles (such as the vehicle 400 described above) of a fleet of vehicles.

Even though the server 500 is herein illustrated as one device, the server 500 may be a distributed computing system, formed by a number of different computational devices.

The server 500 comprises control circuitry 502. The control circuitry 502 may physically comprise one single circuitry device. Alternatively, the control circuitry 502 may be distributed over several circuitry devices.

As shown in the example of FIG. 5, the server 500 may further comprise a transceiver 506 and a memory 508. The control circuitry 502 being communicatively connected to the transceiver 506 and the memory 508. The control circuitry 502 may comprise a data bus, and the control circuitry 502 may communicate with the transceiver 506 and/or the memory 508 via the data bus.

The control circuitry 502 may be configured to carry out overall control of functions and operations of the server 500. The control circuitry 502 may include a processor 504, such as a central processing unit (CPU), microcontroller, or microprocessor. The processor 504 may be configured to execute program code stored in the memory 508, in order to carry out functions and operations of the server 500. The control circuitry 502 is configured to perform the steps of the method 200 as described above in connection with FIG. 2. The steps may be implemented in one or more functions stored in the memory 508.

The transceiver 506 is configured to enable the server 500 to communicate with other entities, such as vehicles or other servers. The transceiver 506 may both transmit data from and receive data to the server 500.

The memory 508 may be a non-transitory computer-readable storage medium. The memory 508 may be one or more of a buffer, a flash memory, a hard drive, a removable media, a volatile memory, a non-volatile memory, a random access memory (RAM), or another suitable device. In a typical arrangement, the memory 508 may include a non-volatile memory for long-term data storage and a volatile memory that functions as system memory for the server 500. The memory 508 may exchange data with the circuitry 502 over the data bus. Accompanying control lines and an address bus between the memory 508 and the circuitry 502 also may be present.

Functions and operations of the server 500 may be implemented in the form of executable logic routines (e.g., lines of code, software programs, etc.) that are stored on a non-transitory computer readable recording medium (e.g., the memory 508) of the server 500 and are executed by the circuitry 502 (e.g., using the processor 504). Put differently, when it is stated that the circuitry 502 is configured to execute a specific function, the processor 504 of the circuitry 502 may be configured execute program code portions stored on the memory 508, wherein the stored program code portions correspond to the specific function. Furthermore, the functions and operations of the circuitry 502 may be a stand-alone software application or form a part of a software application that carries out additional tasks related to the circuitry 502. The described functions and operations may be considered a method that the corresponding device is configured to carry out, such as the method 200 discussed above in connection with FIG. 2. In addition, while the described functions and operations may be implemented in software, such functionality may as well be carried out via dedicated hardware or firmware, or some combination of one or more of hardware, firmware, and software. In the following, the function and operations of the server 500 is described.

The control circuitry 502 is configured to receive, from a vehicle, data indicative of having detected an evasive maneuver by the vehicle or a further road user, despite no object being detected by the object detection model in a scene at which the evasive maneuver was detected.

The control circuitry 502 is further configured to receive sensor data pertaining to the scene at which the evasive maneuver was detected.

The control circuitry 502 is further configured to store the sensor data as training data for the object detection model.

It should be noted that the principles, features, aspects, and advantages of the method 200 as described above in connection with FIG. 2, are applicable also to the server 500 as described herein. In order to avoid undue repetition, reference is made to the above.

The server 500 may be further configured to perform the steps of the method 300 for training an object detection model, as described above in connection with FIG. 3. Alternatively, a further server may be provided in accordance with the present inventive concept for performing the method 300 for training the object detection model. The further server may have the same configurations as the server 500 as described above.

The further server (or the server 500 described above) may be configured to obtain a training dataset comprising training data collected by the method 100 described above in connection with FIG. 1 or the method 200 described above in connection with FIG. 2. The further server (or the server 500 described above) may be further configured to train the object detection model on the obtained training dataset.

Figure 6:
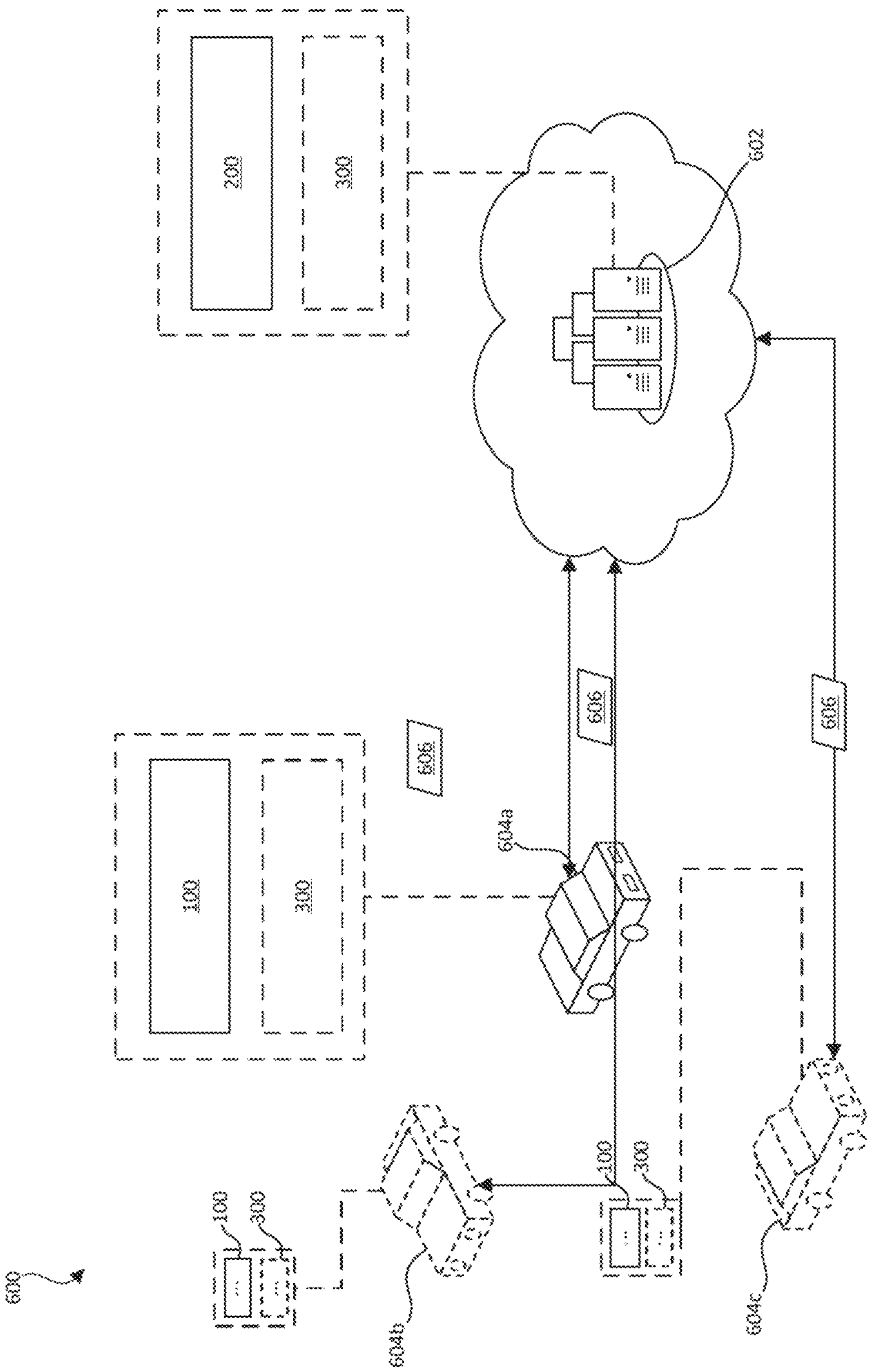
FIG. 6 is a schematic illustration of a distributed system for collecting data for subsequent training of an object detection model in accordance with some embodiments.

FIG. 6 illustrates, by way of example, a distributed system 600 for collecting training data for an object detection model. The system 600 may additionally, or alternatively, be a system 600 for training the object detection model. The system 600 should be seen as a non-limiting example of a realization of the herein disclosed aspects of the present inventive concept. For instance, the system 600 is configured to perform the method 100 as described above in connection with FIG. 1. The system 600 may be further configured to perform the method 200 as described above in connection with FIG. 2. The system 600 may be further configured to perform the method 300 as described above in connection with FIG. 3. Thus, any features or principles described above in connection with FIGS. 1 to 5 are applicable also to the system 600 as described herein and vice versa, unless otherwise stated.

The system 600 comprises a server 602 (or remote, cloud, central, back-office, fleet, or back-end server), referred to in the following as the remote server 602 or just server 602. The server 602 may be the server 500 as described above in connection with FIG. 5. Thus, the server 602 may be configured to perform the method 200 as described in connection with FIG. 2 above. The server 602 may be further configured to perform the method 300 as described in connection with FIG. 3. As illustrated, the server 602 may be provided in the cloud, i.e. as a cloud-implemented server.

The system 600 further comprises one or more vehicles 604*a-c,* also referred to as a fleet of vehicles 604*a-c*. The one or more vehicles 604*a-c* may be vehicles as described above in connection with FIG. 4. Thus, the one or more vehicles 604*a-c* may be configured to perform the method 100 as described in connection with FIG. 1. The vehicles 604*a-c* may be further configured to perform the method 300 as described in connection with FIG. 3.

The one or more vehicles 604*a-c* are communicatively connected to the remote server 602 for transmitting and/or receiving data 606 between the vehicles and the server. The one or more vehicles 604*a-c* may be further communicatively connected to each other. The data 606 may be any kind of data, such as communication signals, or sensor data. The communication may be performed by any suitable wireless communication protocol. The wireless communication protocol may e.g. be long range communication protocols, such as cellular communication technologies (e.g. GSM, GPRS, EDGE, LTE, 5G, 5G NR, etc.) or short to mid-ranged communication protocols, such as Wireless Local Area (LAN) (e.g. IEEE 802.11) based solutions. The sever 602 comprises a suitable memory and control circuitry, for example, one or more processors or processing circuitry, as well as one or more other components such as a data interface and transceiver. The server 602 may also include software modules or other components, such that the control circuity can be configured to execute machine-readable instructions loaded from memory to implement the steps of the method to be performed.

The fleet illustrated in FIG. 6 comprises three vehicles, a first, second and third vehicle 604*a-c,* by way of example. The system 600 may however comprise any number of vehicles 604*a-c*. In the following, the system 600 will be described mainly with reference to the first vehicle 604*a*. It is to be understood that the principles apply to any vehicle of the fleet of vehicles.

In the following, an example of how the system 600 may perform the collection of training data for an object detection model according to some embodiments will be described. For further details regarding the different steps, reference is made to FIGS. 1 and 2 above to avoid undue repetition.

In response to the vehicle 604*a* detecting an evasive maneuver, either by the vehicle 604*a* itself, or by another road user (e.g. another vehicle of the fleet of vehicles, or a vehicle not part of the fleet of vehicles), the vehicle 604*a* obtains sensor data pertaining to a scene at which the evasive maneuver was detected (i.e. corresponding to step S102).

The vehicle 604*a* then determines (i.e. corresponding to step S104), by an object detection model of the vehicle 604*a,* whether an object is detected in the scene. This may be done by inputting the sensor data into the object detection model.

If no object is detected, the vehicle 604*a* then stores (i.e. corresponding to step S106), at least temporarily, the sensor data. The sensor data may be stored e.g. until a request for the sensor data is received, or for a certain amount of time. Moreover, the vehicle 604 transmits (i.e. corresponding to step S114) data indicative of having detected the evasive maneuver to the server. The data further comprises a geographical location of the scene at which the evasive maneuver was detected.

The server 602 being in communication with a fleet of vehicles may receive such data indicative of detected evasive maneuvers from one or more vehicles (i.e. corresponding to step S202) of the fleet of vehicles. Thereby, the server 602 can aggregate the received detections of evasive maneuvers to find out if a certain number of evasive maneuvers have occurred in the same general area, i.e. in generally the same geographical location. More specifically, in response to receiving said data indicative of the evasive maneuver having been detected, the server 602 may determine whether a number of evasive maneuvers detected at geographical locations within a certain geographical area exceeds a threshold value. In case the threshold value has been exceeded, the server 602 transmits (i.e. corresponding to step S204) a request for obtaining sensor data pertaining to the scene at which the evasive maneuver(s) has been detected.

As explained in the foregoing, the request for obtaining the sensor data may be transmitted to the vehicle 604*a*, or any other vehicle of the fleet of vehicles which may have stored sensor data pertaining to the scene or which may obtain such sensor data.

In some embodiments, the server 602 may further receive trajectories of the detected evasive maneuvers. The server 602 may then be further configured to determine an expected geographical location of the object, and/or a region in which the object may be present. Information about the geographical location and/or the region of the object may be used as annotation data for the object.

In case the vehicle 604*a* receives a request for the sensor data, the vehicle 604*a* transmits (i.e. corresponding to step S116) the sensor data to the server 602.

The server 602 in turn, stores (i.e. corresponding to step S208) any received sensor data as training data for the object detection model.

The server 602 may further assign (i.e. corresponding to step S210) annotation data to the sensor data. In case the annotation data indicates that no object is present, the server may store the sensor (i.e. corresponding to step S212) data as training data for a lane estimation model of the automated driving system, instead of as training data for the object detection model.

The above-described process of the system 600 is to be understood as a non-limiting example of the presently disclosed technology for improved understanding. Further variants are apparent from the present disclosure and readily realized by the person skilled in the art. For example, in some embodiments, the data indicative of having detected the evasive maneuver, which is transmitted from the vehicle 604*a* to the server 602, may further comprise the obtained sensor data. The server 602 may then decide whether to store the sensor data as training data or discard the sensor data, based on further evaluation, such as checking whether the threshold value for a number of detected evasive maneuvers in the same geographical area are exceeded.

The illustrated system as described above provides for an efficient way of collecting training data of e.g. new or rare objects occurring in the road, such as debris or other obstacles. The system is efficient in terms of time, since a fleet of multiple vehicles is utilized to collect and transmit potential training samples. This may increase the amount of training samples that can be collected in a certain time. The system 600 may be further efficient in terms of data management (e.g. transmission and storage), since the sensor data only needs to be transmitted from a vehicle to the server in case the server explicitly requests it (in response to finding the sensor data of interest). The system 600 may be further advantageous in that the automated collection of data can be made more reliable, when using a number of detected evasive maneuvers in generally the same area as a signal of a relevant object being present at the scene.

As stated above, the system 600 may be further configured to perform the method 300 for training an object detection model. Training of the object detection model may be performed by so-called federated learning.

Federated learning is a scheme where a "global" or "central" model is consolidated from "local" models trained at the edge. This is prevalent in "voice assistants" and "typing models" for e.g. smart phones. In the present context, the vehicles constitute the edge devices or nodes, while the remote server (or a plurality of remote servers) may constitute the central server responsible for aggregating or consolidating the model updates from each of the edge devices. This would be referred to as a centralized federated learning scheme. However, in some embodiments the need for a central entity may be omitted and the edge devices (e.g. a fleet of vehicles) may be configured to coordinate themselves to obtain the global model, a so called decentralized federated learning scheme. In the following the description is mainly given in reference to a centralized federated learning scheme. It is however presumed that those skilled in the art would readily appreciate how to implement the teachings herein to a decentralized federated learning scheme, and that the scope conveyed by the invention disclosed herein encompasses such a realization. It should be noted that the term "global" does not necessarily imply "worldwide", in the present context, but should instead be construed as something that is "shared" among a plurality of "local" entities.

In the present example, training (or re-training) S304 the object detection model on a training dataset comprising training data collected by the method 100 performed by a vehicle or method 200 performed by the server, may be performed in the vehicle 604*a*. The training dataset may be obtained from the remote server 602 and collected by sensor data obtained by the vehicle itself or other vehicles of the fleet of vehicles. Optionally, the vehicle 604*a* transmits the trained (or re-trained) object detection model to the remote server 602. The remote server 602 may in turn distribute the trained object detection model to other vehicles of the system. Alternatively, the remote server 602 may form an aggregated object detection model from two or more object detection models, which is then distributed.

Alternatively, the training S304 of the object detection model may be performed by the remote server 602. The remote server 602 may collect training data from the fleet of vehicles, as explained above. The server 602 may then distribute the trained object detection model to the one or more vehicles 604*a-c* of the system 600.

FIG. 7A schematically illustrates, by way of example, a first driving scenario 700 in which an evasive maneuver is detected. More specifically, FIG. 7A illustrates a scenario in which a vehicle 702 detects an evasive maneuver of itself. The evasive maneuver may be caused e.g. by a driver of the vehicle, or by an automated driving system of the vehicle.

The vehicle 702 is herein illustrated as travelling along a first lane 706*a* defined by a first lane marker 708*a* and a second lane marker 708*b*. A neighboring, or second lane 706*b* is also illustrated and defined by the second lane marker 708*b* and a third lane marker 708*c*. The vehicle 702 may be a vehicle 400 as described in the foregoing. As explained in the foregoing, the vehicle 702 comprises one or more sensors, herein represented by a camera 704. Further, an expected trajectory 714 of the vehicle is illustrated as a dotted arrow along a lane center of the first lane 706*a*.

As is further illustrated in FIG. 7A, an object 710 is present ahead of the vehicle 702 in its travelling direction. The object 710 herein represents some kind of debris or other form of obstacle on the road.

A position of the vehicle 702 at a later point in time is herein illustrated by the vehicle 702' in broken lines. Moreover, an actual trajectory is illustrated by the dash-dotted line denoted 714'. The actual trajectory 714' represents the trajectory along which the vehicle 702' has actually travelled. The actual trajectory 714' herein deviates from the expected trajectory 714 of the vehicle 702. This deviation may e.g. be caused by a driver of the vehicle trying to avoid the object 710. An evasive maneuver of the vehicle can thus be detected based on the deviation of the vehicle 702 from the expected trajectory.

Further illustrated in FIG. 7A are trajectories 712*a-g* of a number of previously detected evasive maneuvers. These trajectories 712*a-g* may be stored by the server. As explained in the foregoing, the server may request sensor data pertaining to the scene of the detected evasive maneuver(s) in response to a number of evasive maneuvers detected at geographical locations within a geographical area exceeding a threshold value. A geographical area is herein represented by a circle in dash-dotted line, and denoted by 716. It is however to be noted that the shape and size of the geographical area is not limited to the illustrated example. In the illustrated example, there is currently seven evasive maneuvers detected within the geographical area 716, namely the trajectories 712*a-g* of the previously detected evasive maneuvers, and the actual trajectory 714' of the vehicle 702. In case the threshold value would be six, the vehicle 702 performing (and detecting) the seventh evasive maneuver at the geographical area 716 may trigger the server to request sensor data of the scene at which the evasive maneuvers have taken place.

FIG. 7B schematically illustrates, by way of example, a second driving scenario 700' in which an evasive maneuver is detected. More specifically, FIG. 7B illustrates a scenario in which the vehicle 702 detects an evasive maneuver of another road user. As in the first scenario 700, the second scenario 700' illustrates the vehicle 702 travelling along the first lane 706*a*. A further road user, herein illustrated as a further vehicle 720 is illustrated as travelling along the second lane 706*b*. An expected trajectory 718 of the further vehicle 720 is illustrated by the dotted arrow. The expected trajectory 718 may be determined by the vehicle 702 as a trajectory, along which the further vehicle 720 is expected to travel.

In the second scenario 700', the object 710 is present in the road ahead of the further vehicle 720. The vehicle illustrated in dashed lines, herein denoted 720' represents the further vehicle 720 at a later point in time at which the further vehicle 720' has encountered the object 710. Further illustrated is an actual trajectory 718' of the further vehicle 720', represented by the dash-dotted line.

In case the further road user 720 is within a sensor range of the vehicle 702, the vehicle 702 may detect the trajectory of the further vehicle 720 as an evasive maneuver. The vehicle 702 may then obtain sensor data of a scene at which the evasive maneuver was detected, and proceed with the method 100 as described in the foregoing.

The present invention has been presented above with reference to specific embodiments. However, other embodiments than the above described are possible and within the scope of the invention. Different method steps than those described above, performing the methods by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the methods according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

It should be noted that any reference signs do not limit the scope of the claims, that the invention may be at least in part implemented by means of both hardware and software, and that the same item of hardware may represent several "means" or "units".

The invention claimed is:

1. A method for collecting data for subsequent training of an object detection model of an automated driving system, the method being performable by a vehicle, comprising the steps of:

in response to detecting an evasive maneuver of the vehicle or a further road user, obtaining sensor data pertaining to a scene at which the evasive maneuver was detected;

determining, by the object detection model, whether an object is detected in the scene based on the sensor data; and in response to no object being detected, storing the sensor data for subsequent training of the object detection model.

2. The method according to claim 1, further comprising:

obtaining additional sensor data pertaining to the scene at which the evasive maneuver was detected; and storing said additional sensor data as additional data for subsequent training of the object detection model.

3. The method according to claim 1, wherein the evasive maneuver is a maneuver deviating from an expected trajectory of the vehicle or the further road user.

4. The method according to claim 3, wherein the expected trajectory is formed based on a lane estimation model.

5. The method according to claim 1, wherein detecting the evasive maneuver is based on a lateral movement of the vehicle or the further road user.

6. The method according to claim 1, further comprising transmitting the sensor data pertaining to the scene at which the evasive maneuver was detected to a server.

7. The method according to claim 1, further comprising storing a geographical location of the scene at which the evasive maneuver was detected.

8. A non-transitory computer readable storage medium storing instructions, which when the program is executed by a computing device, causes the computing device to carry out the method according to claim 1.

9. A method for collecting data for subsequent training of an object detection model of an automated driving system, the method being performable by a server, comprising the steps of:

receiving, from a vehicle, data indicative of having detected an evasive maneuver of the vehicle or a further road user, despite no object being detected by the object detection model in a scene at which the evasive maneuver was detected;

receiving sensor data pertaining to the scene at which the evasive maneuver was detected;

storing the sensor data for subsequent training of the object detection model.

10. The method according to claim 9, wherein the sensor data pertaining to the scene at which the evasive maneuver was detected is received in response to transmitting a request for the sensor data to the vehicle.

11. The method according to claim 10, wherein the data indicative of having detected an evasive maneuver of the vehicle or the further road user further comprises a geographical location at which the evasive maneuver was detected, wherein transmitting request for the sensor data is performed in response to a number of evasive maneuvers detected at geographic locations within a defined geographic area exceeds a threshold value.

12. The method according to claim 9, further comprising assigning annotation data to the sensor data;

wherein storing the sensor data for subsequent training of the object detection model is performed in response to the annotation data being indicative of an object being present in the scene; and wherein, in response to the annotation data being indicative of no object being present in the scene, the method further comprises storing the sensor data for subsequent training of a lane estimation model of the automated driving system.

13. A non-transitory computer readable storage medium storing instructions, which when the program is executed by a computing device, causes the computing device to carry out the method according to claim 9.

14. A vehicle enabled for collecting data for subsequent training of an object detection model configured to detect objects in a surrounding environment of a vehicle, the vehicle comprising:

one or more sensors; and control circuitry configured to:

in response to detecting an evasive maneuver of the vehicle or a further road user, obtain sensor data pertaining to a scene at which the evasive maneuver was detected;

determine, by the object detection model, whether an object is detected in the scene based on the sensor data; and in response to no object being detected, store the sensor data for subsequent training of the object detection model.

15. A server for collecting data for subsequent training of an object detection model of an automated driving system, the server comprising control circuitry configured to:

receive, from a vehicle, data indicative of having detected an evasive maneuver by the vehicle or a further road user, despite no object being detected by the object detection model in a scene at which the evasive maneuver was detected;

receive sensor data pertaining to the scene at which the evasive maneuver was detected; and store the sensor data for subsequent training of the object detection model.

* * * * *